(12) United States Patent
Goto

(10) Patent No.: US 9,038,955 B2
(45) Date of Patent: May 26, 2015

(54) FUEL TRANSFER SYSTEM CONTROLLED BY FLOAT VALVES

(75) Inventor: Kenichi Goto, Greensboro, NC (US)

(73) Assignee: Honda Patents & Technologies North America, LLC, Torrance, CA (US)

( * ) Notice: Subject to any disclaimer, the term of this patent is extended or adjusted under 35 U.S.C. 154(b) by 411 days.

(21) Appl. No.: 13/559,227

(22) Filed: Jul. 26, 2012

(65) Prior Publication Data

US 2014/0027575 A1    Jan. 30, 2014

(51) Int. Cl.
*B64D 37/14*    (2006.01)
*B64D 37/28*    (2006.01)

(52) U.S. Cl.
CPC ..................................... *B64D 37/28* (2013.01)

(58) Field of Classification Search
CPC ........ B64D 37/00; B64D 37/04; B64D 37/14; B64D 37/16
USPC ................ 244/135 A, 135 C, 135 R; 137/391
See application file for complete search history.

(56) References Cited

U.S. PATENT DOCUMENTS

| | | | |
|---|---|---|---|
| 6,997,415 B2 | 2/2006 | Wozniak et al. |
| 7,337,795 B2 | 3/2008 | Johnson et al. |
| 7,357,149 B2 | 4/2008 | Howe |
| 7,568,660 B2 | 8/2009 | Howe |
| 2006/0278761 A1 | 12/2006 | Cutler et al. |
| 2010/0044515 A1 | 2/2010 | Neto |
| 2011/0147530 A1 | 6/2011 | Rahman et al. |

OTHER PUBLICATIONS

International Search Report dated Dec. 30, 2013, 2 pages.

*Primary Examiner* — Philip J Bonzell
*Assistant Examiner* — Nicholas McFall
(74) *Attorney, Agent, or Firm* — Rankin, Hill & Clark LLP

(57) ABSTRACT

A fuel transfer system for an aircraft includes an upper tank, a lower tank, a fuel transfer line connecting the upper tank to the lower tank, an upper fuel transfer line outlet in the lower tank, a lower fuel transfer line outlet in the lower tank, an upper float valve associated with the upper fuel transfer line outlet, and a lower float valve associated with the lower fuel transfer line outlet. The upper fuel transfer line outlet, which is in the lower tank, is in fluid communication with the upper tank. The lower fuel transfer line outlet, which is located in the lower tank, is in fluid communication with the upper tank.

11 Claims, 3 Drawing Sheets

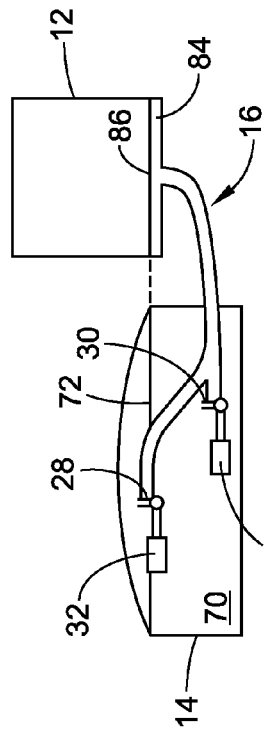
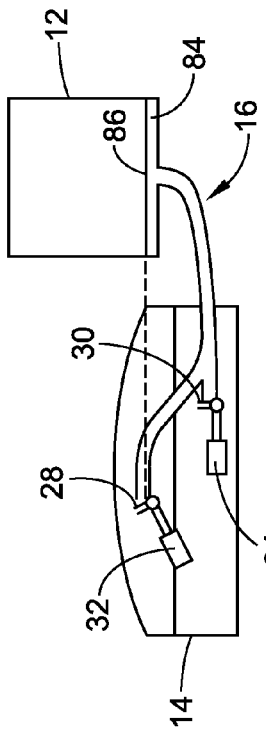
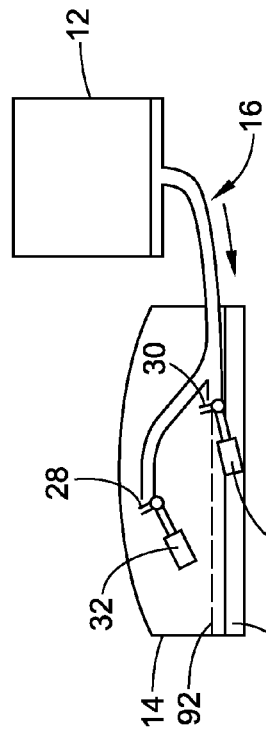
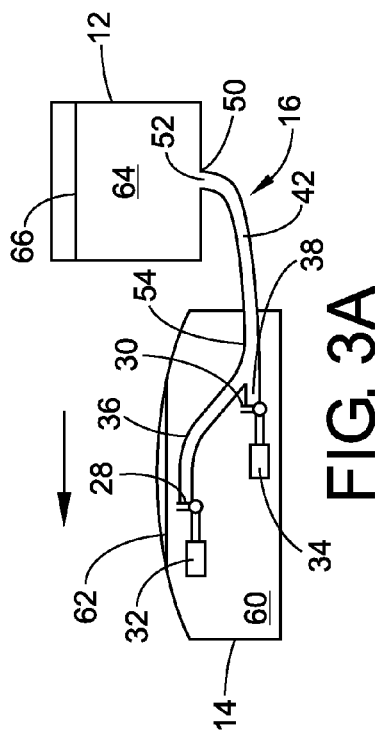
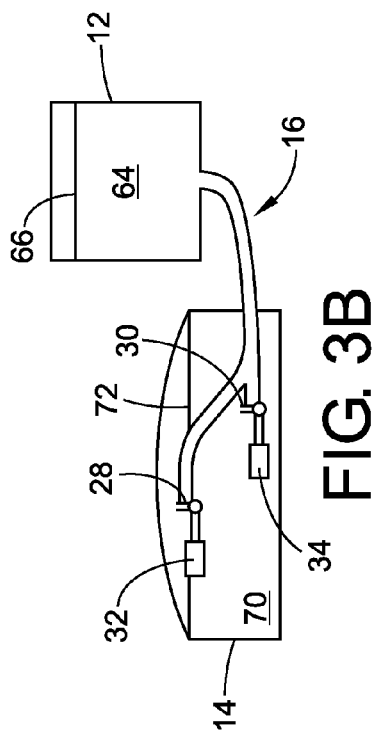
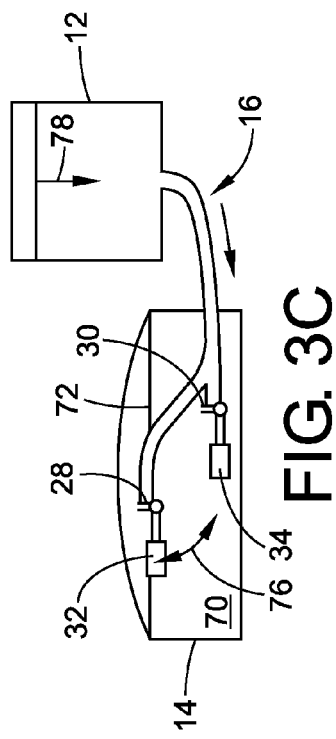

US 9,038,955 B2

FUEL TRANSFER SYSTEM CONTROLLED BY FLOAT VALVES

The present disclosure is directed to a fuel transfer system and method for an aircraft.

BACKGROUND

Fuel tanks of an aircraft can be located in the wing structure as integral fuel tanks. Additional fuel tanks are sometimes located in the fuselage or tail of the aircraft to extend the flying range of the aircraft.

With general design, each wing is attached below or at a lower portion of the fuselage. This configuration provides a difference in height between a fuselage tank and each wing tank. When plural tanks are connected, fuel pressure head is applied from the uppermost fluid level of the upper tank to the bottom of the lower tank.

Aircraft structure should be designed to withstand the fuel pressure as well as other maneuver loads and aerodynamic loads. When maneuver acceleration is applied in the vertical direction, the fuel pressure increases proportionately. For example, vertical acceleration in emergency landing is specified as 6.0 g downward for normal category airplanes. The fuel tanks should withstand the generated pressure under such high-acceleration conditions. If the upper tank is hydraulically connected to the lower tank, it will require additional reinforcement to the lower fuel tank structure.

A general solution for the aforementioned issue is usually provided in one of two methods. A first method is to disconnect two tanks by a shutoff valve, and to open the shutoff valve as required when fuel in the lower tank is consumed. The second method is to transfer fuel from the upper tank to the lower tank by a transfer pump. In either method, level sensors and manual or automatic electronic control devices are required. This makes the fuel management system more complicated.

Another example of an auxiliary fuel tank system includes upper aft auxiliary fuel tanks and a forward auxiliary fuel tank. The aforementioned fuel tank system also includes a center wing tank, which is the aircraft's existing fuel tank. The sequence of gravity fuel transfer from the auxiliary tanks to the center wing tank is set in three stages. First, the aft auxiliary fuel tanks transfer fuel into the center wing tank until the aft auxiliary fuel tanks become empty. Next, the forward auxiliary tank transfers fuel into the center wing tank until the forward auxiliary tank becomes empty. Finally, the center wing tank transfers all remaining fuel into the wing tanks until the center wing tank becomes empty.

SUMMARY

An example of a fuel transfer system for an aircraft having advantages over the aforementioned systems includes an upper tank for storing fuel, a lower tank for storing fuel, a fuel transfer line connecting the upper tank to the lower tank, an upper fuel transfer line outlet in the lower tank, a lower fuel transfer line outlet in the lower tank, an upper float valve associated with the upper fuel transfer line outlet, and a lower float valve associated with the lower fuel transfer line outlet. The lower tank is disposed below the upper tank. The upper fuel transfer line outlet, which is in the lower tank, is in fluid communication with the upper tank. Fuel transferred from the upper tank to the lower tank passes through the upper fuel transfer line outlet. The lower fuel transfer line outlet, which is located in the lower tank, is in fluid communication with the upper tank. Fuel transferred from the upper tank to the lower tank also passes through the lower fuel transfer line outlet.

An example of a method for drawing fuel in an aircraft includes drawing fuel from a lower tank until the lower tank reaches a first reduced lower tank volume. The method further includes drawing fuel from the lower tank while substantially maintaining the first reduced lower tank volume in the lower tank until an upper tank, which is in fluid communication with the lower tank, reaches a first reduced upper tank volume. The method further includes drawing fuel from the lower tank until the lower tank reaches a second reduced lower tank volume. The method further includes drawing fuel from the lower tank while substantially maintaining the second reduced lower tank volume in the lower tank until the upper tank reaches a second reduced upper tank volume.

BRIEF DESCRIPTION OF THE DRAWINGS

FIGS. 3A-3F schematically depict a method for drawing fuel in an aircraft having the fuel transfer system depicted in FIG. 1.

DETAILED DESCRIPTION

Figure 1:
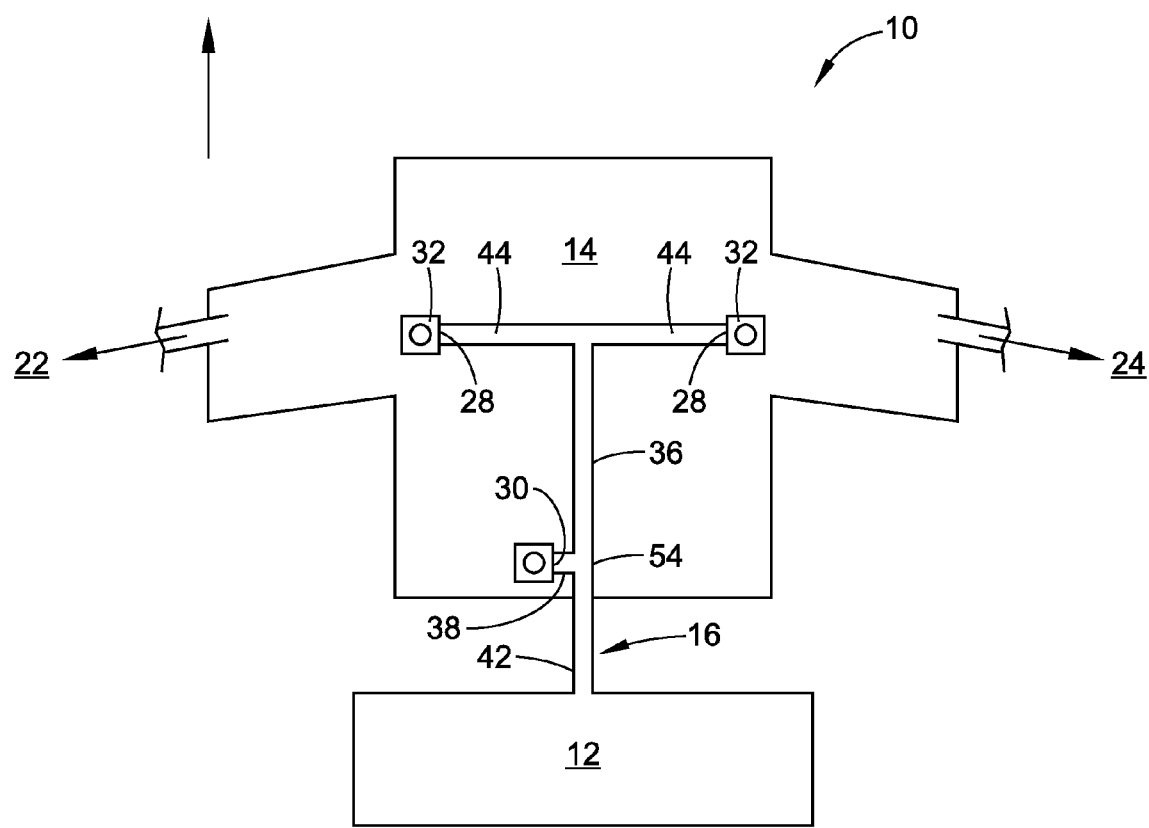
FIG. 1 is a schematic depiction of a fuel transfer system for an aircraft.

With reference to FIG. 1, a fuel transfer system 10 for an aircraft (only a portion of which is shown in FIG. 3) includes an upper tank 12 for storing fuel, a lower tank 14 for storing fuel, and a fuel transfer line 16 connecting the upper tank 12 to the lower tank 14. The fuel transfer system 10 provides fuel transfer from the upper tank 12 to the lower tank 14 by gravity allowing an appropriate fuel consumption sequence, which accomplishes desirable center of gravity movement while providing fuel pressure isolation by disconnecting hydraulic pressure between the upper tank 12 and the lower tank 14.

Figure 2:
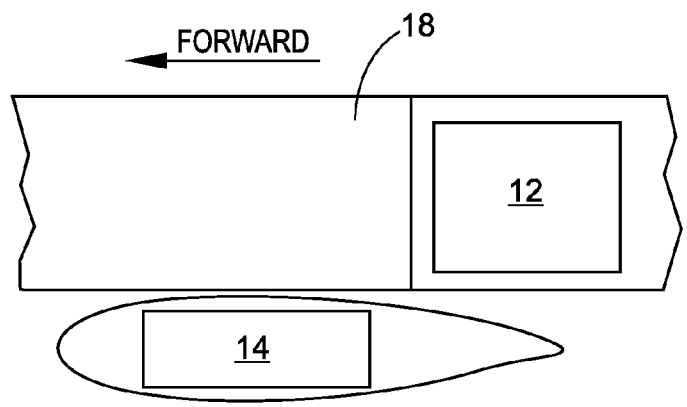
FIG. 2 is a schematic depiction of portions of an aircraft including the fuel transfer system depicted in FIG. 1.

With reference to FIG. 2, the upper tank 12 can be located within a fuselage 18 of the aircraft. As depicted in FIG. 2, the upper tank 12 is disposed rearward of the lower tank 14. The lower tank 14 can be a center wing tank. With reference back to FIG. 1, the aircraft can further include a left wing tank 22 and a right wing tank 24, which each are connected with the lower, or center wing, tank 14. Fuel transfer from the upper tank 12 to the lower tank 14 is accomplished by gravity through the fuel transfer line 16.

As more clearly seen in FIGS. 3A-3F, the fuel transfer system 10 further includes an upper fuel transfer line outlet 28 in the lower tank 14. The upper fuel transfer line outlet 28 is in fluid communication with the upper tank 12 via the fuel transfer line 16. Fuel transferred from the upper tank 12 to the lower tank 14 passes through the upper fuel transfer line outlet 28. With reference back to FIG. 1, two upper fuel transfer line outlets 28 are provided in the fuel transfer system 10. Two upper fuel transfer line outlets 28 are provided in the fuel transfer system 10 because of the shape of the lower tank 14. The use of two upper fuel transfer line outlets 28 also enhances redundancy in the fuel transfer system 10. Nevertheless, the fuel transfer system 10 may only employ one upper fuel transfer line outlet 28.

The fuel transfer system 10 further includes a lower fuel transfer line outlet 30 in the lower tank 14. The lower fuel transfer line outlet 30 is in fluid communication with the upper tank 12 via the fuel transfer line 16. Fuel transferred from the upper tank 12 to the lower tank 14 passes through the lower fuel transfer line outlet 30. In the illustrated embodiment, the lower fuel transfer line outlet 30 is disposed lower than or beneath the upper fuel transfer line outlet 28 and within the lower fuel tank 14.

The fuel transfer system 10 further includes an upper float valve 32 associated with the upper fuel transfer line outlet 28 for opening and closing the upper fuel transfer line outlet 28. With reference back to FIG. 1, the fuel transfer system 10 can include two upper float valves 32 each associated with a respective upper fuel transfer line outlet 28. The use of two upper float valves 32 is due to the shape of the lower tank 14 and also enhances redundancy of the fuel transfer system 10. Nevertheless, where only one upper fuel transfer line outlet 28 is used, a single upper float valve associated with the single upper fuel transfer line outlet 28 would be employed.

The fuel transfer system 10 further includes a lower float valve 34 associated with the lower fuel transfer line outlet 30 for opening and closing the lower fuel transfer line outlet 30. The upper float valve(s) 32 and the lower float valve 34 can be conventional float valves. Each float valve 32, 34 is closed when submerged in fuel. With each float valve closed, hydraulic pressure between the upper tank 12 and the lower tank 14 is disconnected. Each float valve 32, 34 opens when a fuel level adjacent the respective fuel line transfer outlet 28, 30 falls below the respective fuel line transfer outlet 28, 30.

In the illustrated embodiment, the fuel transfer line 16 includes an upper branch 36, a lower branch 38, and a main branch 42. With reference back to FIG. 1, the fuel transfer system 10 can further include additional upper branches 44. As illustrated in FIG. 1, the fuel transfer system 10 includes two upper branches 44 each terminating with a respective upper fuel transfer line outlet 28. The upper fuel transfer line outlet 28 is on the upper branch 36, 44 and the lower fuel transfer line outlet 30 is on the lower branch 38. The main branch 42 of the fuel transfer line 16 connects at a first end 50 with an upper tank fuel outlet 52. Fuel being transferred from the upper tank 12 to the lower tank 14 exits the upper tank 12 through the upper tank fuel outlet 52.

The upper branch 36, 44 and a lower branch 38 each connect with the main branch 42. In the illustrated embodiment, the upper branch 36 and the lower branch 38 each are located in the lower tank 14. As illustrated, the upper branch 36, 44 connects with the main branch 42 upstream from the lower fuel transfer line outlet 30. Also in the illustrated embodiment, a second end 54 of the main branch 42 is disposed in the lower tank 14. In an alternative arrangement, the fuel transfer line 16 could include the upper branch 36, 44 and the lower branch 38 being disposed outside of the lower tank 14 while each being in communication with the upper tank 12.

With reference to FIG. 3, the upper fuel transfer line outlet 28 and the lower fuel transfer line outlet 30 are each located with respect to the upper tank fuel outlet 52 such that fuel remains in the upper tank 12 when a fuel level in the lower tank 14 is below the upper fuel transfer line outlet 28 and above the lower fuel transfer line outlet 30 (see FIGS. 3D and 3E). As such, the upper fuel transfer line outlet 28 is disposed vertically above the upper tank fuel outlet 52.

A method for drawing fuel in an aircraft will be described with reference to FIGS. 3A-3F. The fuel transfer system 10 is configured such that a first volume of fuel is transferred from the upper tank 12 to the lower tank 14 passing through the upper fuel line transfer outlet 28 and a second remaining volume of fuel is transferred from the upper tank 12 to the lower tank 14 passing through the lower fuel line transfer outlet 30 after the first volume of fuel has been transferred from the upper tank 12 to the lower tank 14. FIG. 3A depicts the fuel transfer system 10 after refueling. The lower fuel tank 14 is depicted as having a maximum lower tank volume 60 at a maximum lower tank fuel level 62. The upper tank 12 is depicted as having a maximum upper tank volume 64 at a maximum upper tank fuel level 66. With the system in the state depicted in FIG. 3A, the upper float valve 32 and the lower float valve 34 are each submerged, i.e., below fluid level in the lower tank 14. The float valves 32 and 34 are submerged to close the respective fuel line transfer outlets 28 and 30 to prevent fuel flow from the upper tank 12 to the lower tank 14.

Proceeding to FIG. 3B, fuel in the lower tank 14 has been consumed until the volume of fuel in the lower tank 14 has reached a first reduced lower tank volume 70 and a first reduced lower tank fuel level 72. In the state shown in FIG. 3B, the upper float valve 32 is still closed and no fuel has been transferred from the upper tank 12 to the lower tank 14. As such, fuel has been drawn from the lower tank 14 until the lower tank reaches the first reduced lower tank volume 70 and the first reduced lower tank fuel level 72 while the upper tank 12 has maintained the maximum upper tank volume 64 and maximum upper tank fuel level 66.

With reference to FIG. 3C, in this state the upper float valve 32 repeatedly opens and closes (denoted by arrow 76) to allow limited fuel flow through the transfer line 16 from the upper tank 12 to maintain a controlled level of fuel, i.e., the first reduced lower tank fuel level 72, in the lower tank 14. Fuel is drawn from the upper fuel tank 12 (denoted by arrow 78) while substantially maintaining the first reduced lower tank volume 70 and the first reduced lower tank fuel level 72 in the lower tank 14. The repeated opening and closing of the upper float valve 32 occurs until the upper tank 12, which is in fluid communication with the lower tank 14, reaches a first reduced upper tank volume 84 and a first reduced upper tank fuel level 86, which is shown in FIG. 3D. When the fuel level in the upper tank 12 balances with the upper float valve 32 and the upper fuel transfer line outlet 28, fuel transfer from the upper tank 12 to the lower tank 14 stops.

With reference to FIG. 3E, fuel in the lower tank 14 is consumed thereafter. The upper float valve 32 opens, but fuel does not transfer from the upper tank 12 to the lower tank 14 because the fuel level in the upper tank 12 balances with the upper float valve 32 and the upper fuel transfer line outlet 28. As such, fuel is drawn from the lower tank 14 while substantially maintaining the first reduced upper tank volume 84 and the first reduced upper tank fuel level 86 in the upper tank 12 until the lower tank reaches a second reduced lower tank volume 90 and second reduced lower tank fuel level 92, which is a dashed line in FIG. 3F. The second reduced lower tank volume 90 is less than the first reduced lower tank volume 70. Also, the second reduced lower tank fuel level 92 is lower than the first reduced lower tank fuel level 72.

When the fuel level in the lower tank 14 reaches to the lower float valve 34 and the lower fuel transfer line outlet 30, i.e., the second reduced lower tank fuel level 92, the lower float valve 34 repeatedly opens and closes in a similar manner as the upper float valve 32 depicted in FIG. 3C. Fuel is drawn from the lower tank 14 while substantially maintaining the second reduced lower tank volume 90 in the lower tank 14 until the upper tank 12 reaches a second reduced upper tank volume, which is empty in the illustrated embodiment. In the state shown in FIG. 3F, residual fuel in the upper tank 12 drains into the lower tank 14.

The first reduced lower tank volume 70 is less than the maximum lower tank volume (maximum capacity) 60 for the lower tank 14. The first reduced upper tank fuel level 86 is substantially vertically equal with the first reduced lower tank fuel level 72 when the upper tank 12 is at the first reduced upper tank volume 84 and the lower tank 14 is at the first reduced lower tank volume 70 (see FIG. 3D). As such, when at this state, the fuel transfer from the upper tank 12 to the lower tank 14 stops. Drawing fuel from the lower tank 14 until the lower tank reaches the second reduced lower tank volume 90 includes substantially maintaining the upper tank 12 at the first reduced upper tank volume 84 (see FIG. 3E). Drawing fuel from the lower tank 14 while substantially maintaining the first reduced lower tank volume 70 includes repeatedly opening and closing the upper float valve 32 in the lower tank 14 (see FIG. 3C). The upper float valve 32 is located in the lower tank 14 at the first reduced lower tank fuel level 72, which coincides with the first reduced lower tank volume 70 (see FIG. 3B). Drawing fuel from the lower tank 14 while substantially maintaining the second reduced lower tank volume 90 includes repeatedly opening and closing the lower float valve 34 in the lower tank 14. The lower float valve 34 is located in the lower tank 14 at the second reduced lower tank fuel level 92, which coincides with the second reduced lower tank fuel volume 90 (see FIG. 3F).

Figure 4:
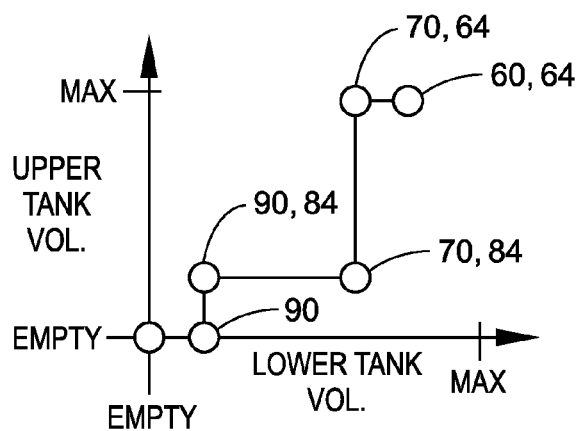
FIG. 4 is a graph depicting fuel consumption sequence of an upper tank and a lower tank using the fuel transfer system depicted in FIG. 1.

A combination of the upper float valve 32 and the lower float valve 34 allows a fuel consumption sequence as shown in FIG. 4. At first, the upper tank 12 and the lower tank 14 are each at maximum volume (capacity) 60, 64, respectively. Fuel is then consumed in the lower tank 14 such that the lower tank 14 reaches the first reduced lower tank volume 70 while the upper tank 12 maintains the maximum upper tank volume 64. Fuel is then transferred from the upper tank 12 to the lower tank 14 while maintaining the lower tank volume at the first reduced lower tank volume 70 until the upper tank volume reaches the first reduced upper tank volume 84. Fuel again is then consumed until the lower tank volume reaches the second reduced lower tank volume 90 while the upper tank 12 maintains the first reduced upper tank volume 84. Then, fuel in the lower tank 14 is consumed and the upper tank 12 empties while the lower tank maintains the second reduced lower tank volume 90. Then the lower tank 14 empties.

Figure 5:
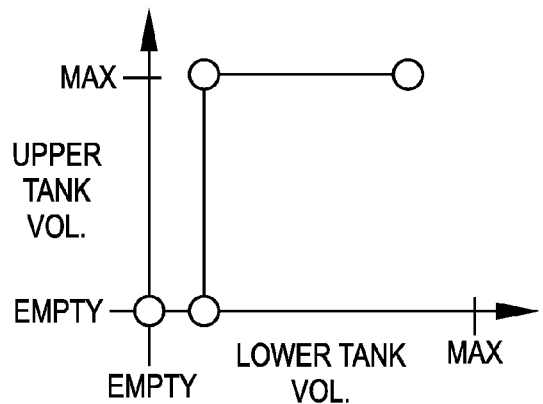
FIG. 5 is a graph depicting fuel consumption sequence of a fuel transfer system not including an upper float valve of the fuel transfer system depicted in FIG. 1.

If a single lower float valve 34 and no upper float valve 32 were used, the fuel consumption sequence would follow the graph shown in FIG. 5. Fuel in the upper tank 12 will not transfer to the lower tank 14 until most of the fuel in the lower tank 14 is consumed. This causes fuel to remain in the upper tank 12 for a longer period of time as compared to the sequence shown in FIG. 4. Where the upper tank 12 is disposed rearward of the lower tank 14, the sequence shown in FIG. 5 can result in a shift of the center of gravity of the aircraft rearwards. If a shift of the center of gravity rearwards is not an issue, then such a configuration may be acceptable.

A fuel transfer system and a method for drawing fuel in an aircraft have been described above with particularity. Modifications and alterations will occur to those upon reading and understanding the preceding detailed description. The invention, however, is not limited to only the embodiments described above. Instead, the invention is broadly defined by the appended claims and the equivalents thereof.

The invention claimed is:
1. A fuel transfer system for an aircraft comprising:
an upper tank for storing fuel;
a lower tank for storing fuel, the lower tank being disposed below the upper tank;
a fuel transfer line connecting the upper tank to the lower tank;
an upper fuel transfer line outlet in the lower tank and in fluid communication with the upper tank, wherein fuel transferred from the upper tank to the lower tank passes through the fuel transfer line and the upper fuel transfer line outlet;
a lower fuel transfer line outlet in the lower tank and in fluid communication with the upper tank, wherein fuel transferred from the upper tank to the lower tank passes through the fuel transfer line and the lower fuel transfer line outlet;
an upper float valve associated with the upper fuel transfer line outlet for opening and closing the upper fuel transfer line outlet; and
a lower float valve associated with the lower fuel transfer line outlet for opening and closing the lower fuel transfer line outlet.

2. The fuel transfer system of claim 1 being configured such that a first volume of fuel is transferred from the upper tank to the lower tank passing through the upper fuel line transfer outlet and a second remaining volume of fuel is transferred from the upper tank to the lower tank passing through the lower fuel line transfer outlet after the first volume of fuel has been transferred from the upper tank to the lower tank.

3. The fuel transfer system of claim 1, wherein the upper tank is disposed in a fuselage of the aircraft rearward of the lower tank.

4. The fuel transfer system of claim 1, wherein the lower tank is a center wing tank.

5. The fuel transfer system of claim 1, wherein the upper fuel transfer line outlet is disposed above an upper tank fuel outlet, wherein fuel being transferred from the upper tank to the lower tank exits the upper tank through the upper tank fuel outlet.

6. The fuel transfer system of claim 1, wherein the fuel transfer line includes an upper branch and a lower branch, wherein the upper fuel transfer line outlet is on the upper branch, wherein the lower fuel transfer line outlet is on the lower branch.

7. The fuel transfer system of claim 6, wherein the fuel transfer line includes a main branch connected at a first end with an upper tank fuel outlet, wherein the upper branch and the lower branch each connect with the main branch.

8. The fuel transfer system of claim 7, wherein the upper branch and the lower branch each are located in the lower tank.

9. The fuel transfer system of claim 7, wherein the upper branch connects with the main branch upstream from the lower fuel transfer line outlet.

10. The fuel transfer system of claim 7, wherein a second end of the main branch is disposed in the lower tank.

11. The fuel transfer system of claim 1, wherein the upper fuel transfer line outlet and the lower fuel transfer line outlet are each located with respect to an upper tank fuel outlet such that fuel remains in the upper tank when a fuel level in the lower tank is below the upper fuel transfer line outlet and above the lower fuel transfer line outlet.

* * * * *